(12) United States Patent
Branca

(10) Patent No.: US 11,271,478 B2
(45) Date of Patent: Mar. 8, 2022

(54) CHARGE PUMP

(71) Applicant: STMicroelectronics (Grenoble 2) SAS, Grenoble (FR)

(72) Inventor: Xavier Branca, Sassenage (FR)

(73) Assignee: STMicroelectronics (Grenoble 2) SAS, Grenoble (FR)

(*) Notice: Subject to any disclaimer, the term of this patent is extended or adjusted under 35 U.S.C. 154(b) by 0 days.

(21) Appl. No.: 17/099,106

(22) Filed: Nov. 16, 2020

(65) Prior Publication Data

US 2021/0159785 A1 May 27, 2021

(30) Foreign Application Priority Data

Nov. 22, 2019 (FR) ...................................... 1913077

(51) Int. Cl.
*H02M 3/07* (2006.01)
*H02M 1/08* (2006.01)

(52) U.S. Cl.
CPC ............... *H02M 3/07* (2013.01); *H02M 1/08* (2013.01)

(58) Field of Classification Search
CPC ............ H02M 3/02; H02M 3/04; H02M 3/06; H02M 3/07; H02M 3/071; H02M 3/072; H02M 3/073; H02M 3/076; H02M 3/078; H02M 1/08; H02M 1/081; H02M 1/082
See application file for complete search history.

(56) References Cited

U.S. PATENT DOCUMENTS

2006/0028854 A1    2/2006  Kawai
2018/0076635 A1    3/2018  Maalouf et al.
2018/0166985 A1*   6/2018  Murata .................. H02M 3/07

FOREIGN PATENT DOCUMENTS

JP      2011024298 A   *  2/2011
KR    1020120116136 A      10/2012

OTHER PUBLICATIONS

NPI Search Report and Written Opinion for FR 1913077 dated Oct. 10, 2020 (8 pages).
George Libin et al: "A 0.04mm$2$ Buck-Boost DC-DC Converter for Biomedical Implants Using Adaptive Gain and Discrete Frequency Scaling Control", IEEE Transactions on Biomedical Circuits and Systems, IEEE, US, vol. 10, N°3, Jun. 1, 2016 (Jun. 1, 2016), pp. 668-678, XP011609058.

* cited by examiner

*Primary Examiner* — Diana J. Cheng
(74) *Attorney, Agent, or Firm* — Crowe & Dunlevy

(57) ABSTRACT

A charge pump generates an output voltage. A first circuit generates a pulse width-modulated signal as a function of a deviation between the output voltage and a setpoint voltage. A second circuit receives a periodic signal and conditions the supply of the periodic signal to a control input of the charge pump as a function of the state of the pulse width-modulated signal.

42 Claims, 3 Drawing Sheets

CHARGE PUMP

PRIORITY CLAIM

This application claims the priority benefit of French Application for Patent No. 1913077, filed on Nov. 22, 2019, the content of which is hereby incorporated by reference in its entirety to the maximum extent allowable by law.

TECHNICAL FIELD

The present disclosure relates generally to electronic circuits and, more specifically, to electronic circuits or devices comprising a charge pump configured to supply, from a supply voltage, an output voltage having a value different from that of the supply voltage, for example a higher value.

BACKGROUND

Known charge pumps in the art generally comprise one or several charge pump circuits or stages. Each stage comprises a capacitor and switches coupling terminals of the capacitor to inputs and outputs of the stage. Each stage, commonly called switched-capacitor charge pump circuit, is configured so that charges are supplied to the capacitor during a first operating phase, and so that charges are removed from the capacitor, for example to be supplied to an output of the stage, during a second operating phase. To that end, the switches of the stage are separated, or distributed, in two sets, the switches of one of these two sets and the other of these two sets respectively being closed and open during the first operating phase, and respectively being open and closed during the second operating phase.

In practice, several first and second phases are implemented successively, by alternating the first and second phases, under the control of a control signal of the charge pump.

Known charge pumps and the devices comprising such charge pumps have various drawbacks.

There is a need to address all or some of the drawbacks of the known charge pump devices. In particular, it is desirable to be able to control the value of an output voltage of the charge pump.

SUMMARY

An embodiment addresses all or some of the drawbacks of known charge pump devices. The embodiment, in particular, addresses the drawbacks related to the control of the charge pump making it possible to regulate a value of an output voltage of the charge pump.

In an embodiment, a device comprises: a charge pump; a first circuit configured to supply a pulse width-modulated signal as a function of a deviation between an output voltage of the charge pump and a setpoint voltage; and a second circuit configured to receive a periodic signal and to condition the supply of the periodic signal to a control input of the charge pump as a function of the state of the pulse width-modulated signal.

According to one embodiment, the second circuit is configured to supply only complete periods of the periodic signal to the control input of the charge pump.

According to one embodiment, the second circuit comprises a D flip-flop, a synchronization input of which is configured to receive the periodic signal, a data input of which is configured to receive the pulse width-modulated signal and an output of which is configured to supply an activation signal conditioning the supply of the periodic signal to the control input of the charge pump.

According to one embodiment, the second circuit further comprises a logic gate, a first input of which is configured to receive the activation signal, a second input of which is configured to receive the periodic signal, and an output of which is coupled to the control input of the charge pump, said logic gate being configured to copy the periodic signal on the output of the logic gate only when the activation signal is in a first state.

According to one embodiment, said logic gate is an AND gate.

According to one embodiment, the first circuit comprises: an error amplifier configured to supply an error signal representative of the deviation between the output voltage and the setpoint voltage; a periodic ramp generator; and a comparator, a first input of which is configured to receive the error signal, a second input of which is configured to receive the periodic ramps, and an output of which is configured to supply the pulse width-modulated signal.

According to one embodiment, the error amplifier is a derivative integral proportional amplifier.

According to one embodiment, a frequency of the pulse width-modulated signal is less than a frequency of the periodic signal.

According to one embodiment, the frequency of the pulse width-modulated signal is at least 10 times lower, preferably at least 50 times lower, than the frequency of the periodic signal.

According to one embodiment, a period of the periodic signal is less than 1 µs.

According to one embodiment, the charge pump is configured to receive a supply potential and a reference potential, the charge pump comprising at least one charge pump circuit including: a capacitor; two sets of switches configured to be controlled from a signal available on the control input such that a first of the two sets is controlled in phase opposition relative to the second of the two sets; a first input configured to receive a first potential; and an output configured to supply a second potential, preferably substantially equal to the sum of the first potential and the supply potential.

According to one embodiment, said at least one charge pump circuit further includes: a second input configured to receive the reference potential; and a third input configured to receive the supply potential.

According to one embodiment, said at least one charge pump circuit includes: a first switch of the first set coupling the first input of the charge pump circuit to a first terminal of the capacitor; a second switch of the first set coupling the second input of the charge pump circuit to a second terminal of the capacitor; a third switch of the second set coupling the first terminal of the capacitor to the output of the charge pump circuit; and a fourth switch of the second set coupling the second terminal of the capacitor to the third input of the charge pump circuit.

According to one embodiment, the charge pump comprises several charge pump circuits connected in series, one after the other.

According to one embodiment, the first input of a first of said charge pump circuits is configured to receive the supply potential and the output of a last of said charge pump circuits is configured to supply the output voltage, each of the charge pump circuits between the first charge pump circuit and the last charge pump circuit having its first input connected to the output of the preceding charge pump circuit and its output connected to the first input of the following charge pump circuit.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the known systems, circuits and devices comprising charge pump have not been described in detail, the disclosed embodiments being compatible with these known systems, circuits and devices.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

A "binary signal" refers to a signal that alternates between a first constant state, for example a low state, denoted logic "0", and a second constant state level, for example a high state, denoted logic "1". The high and low states of different binary signals of a same electronic circuit can be different. In practice, the binary signals can correspond to voltages or currents that may not be perfectly constant in the high or low state.

Figure 1:
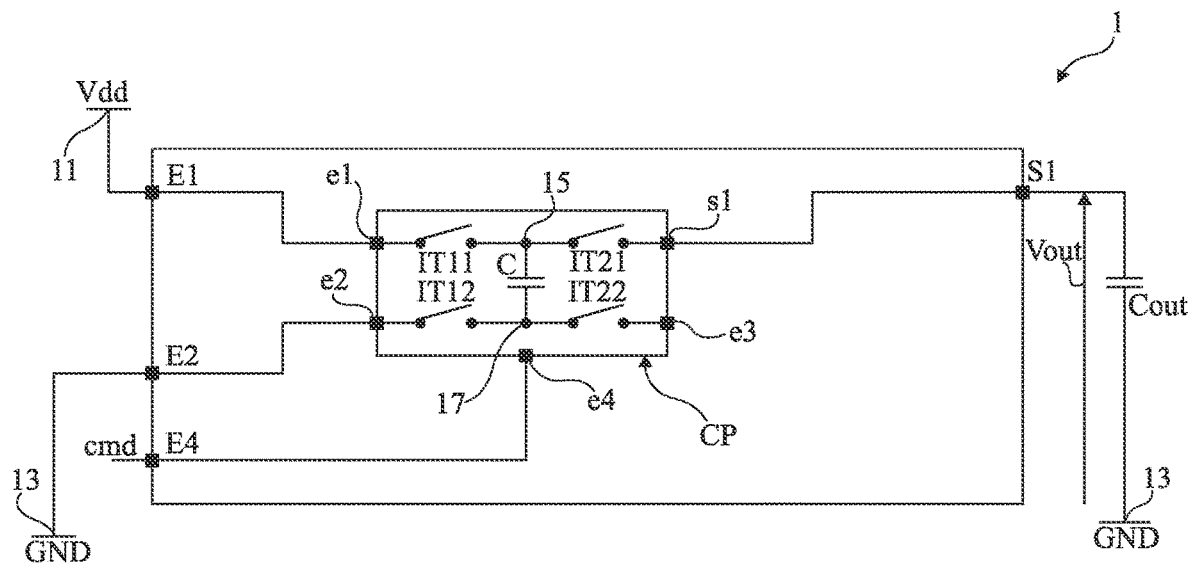
FIG. 1 shows, in the form of a circuit, one embodiment of a charge pump of the type to which the disclosed embodiments apply.

FIG. 1 shows, in the form of a circuit, one embodiment of a charge pump 1 of the type to which the disclosed embodiments apply.

The charge pump 1 comprises an input E1 configured to receive a supply potential Vdd and an input E2 configured to receive a reference potential, typically the ground GND. The potential Vdd is referenced relative to the ground GND. More specifically, the input E1 is connected to a node or a conductive rail 11 placed at the potential Vdd, the input E2 being connected to a node or a conductive rail 13 placed at the potential GND.

The charge pump 1 further comprises an output S1 configured to supply an output potential Vout referenced relative to the ground GND. More specifically, the output S1 is connected to a terminal of a capacitor Cout, the other terminal of which is connected to the ground GND. In this example, the potential Vout is, in a static or steady state, equal to more than one time the supply potential.

The charge pump 1 further comprises a control input E4 configured to receive a control signal cmd.

In this example, the charge pump 1 comprises a single elementary charge pump circuit CP. The circuit CP comprises an input e1 configured to receive a first potential, and an output s1 configured to supply a second potential equal, in steady state, to a multiple of the first potential, and more specifically here, substantially equal to two times the first potential, the first and second potentials being referenced relative to the ground GND. In this example, the input e1 of the circuit CP is connected to the input E1 of the charge pump 1, the output s1 of the circuit CP being connected to the output S1 of the charge pump. The circuit CP comprises an input e2 configured to receive the reference potential, here the ground GND, of the charge pump 1. In this example, the input e2 is connected to the input E2 of the charge pump 1 and receives the ground potential GND. The circuit CP further comprises an input e4 configured to receive a control signal of the circuit CP. In this example, the input e4 is connected to the input E4 of the charge pump 1 and receives the signal cmd. The circuit CP also comprises an input e3 configured to receive the supply potential Vdd of the charge pump 1, the input e3 of the circuit CP being connected to the input E1 of the charge pump 1, although this connection is not explicitly shown in FIG. 1.

In this example, the circuit CP comprises a capacitor C. The circuit CP further comprises a first set of two switches IT11 and IT12, and a second set of two switches IT21 and IT22. The switch IT11 couples a first terminal 15 of the capacitor C to the input e1. The switch IT12 couples a second terminal 17 of the capacitor C to the input e2. The switch IT21 couples the terminal 15 of the capacitor C to the output s1. The switch IT22 couples the terminal 17 of the capacitor C to the input e3.

The switches IT11, IT12, IT21 and IT22 are controlled from the signal received by the input e4 of the circuit CP, in this example the signal cmd, such that the switches IT11 and IT12 of the first set are controlled in phase opposition relative to the switches IT21 and IT22 of the second set. In other words, when the binary signal on the input e4 is in a first binary state, for example during each first operating phase of the circuit CP, the two switches IT11 and IT12 are closed and the two switches IT21 and IT22 are open. The capacitor C then receives the potential Vdd across its terminal 15 and the potential GND across its terminal 17. When the signal on the input e4 is in a second binary state, for example during each second operating phase of the circuit CP, the two switches IT11 and IT12 are open and the two switches IT21 and IT22 are closed. The capacitor C then receives the potential Vdd at its terminal 17. As a result, in static state, the potential across the terminal 15 of the capacitor C, therefore on the output s1 of the circuit CP, is substantially equal to twice the potential Vdd.

The charge pump 1 of the example of FIG. 1 therefore makes it possible to supply, in static state, a potential Vout substantially equal to twice the potential Vdd, or in other words, substantially equal to the sum of the potential Vdd received by its input E1 and the supply potential Vdd.

It is possible to provide that the charge pump 1 comprises several stages CP coupled in parallel and/or in series, such that the charge pump 1 supplies, in static state, a potential Vout greater than substantially twice the potential Vdd.

Figure 2:
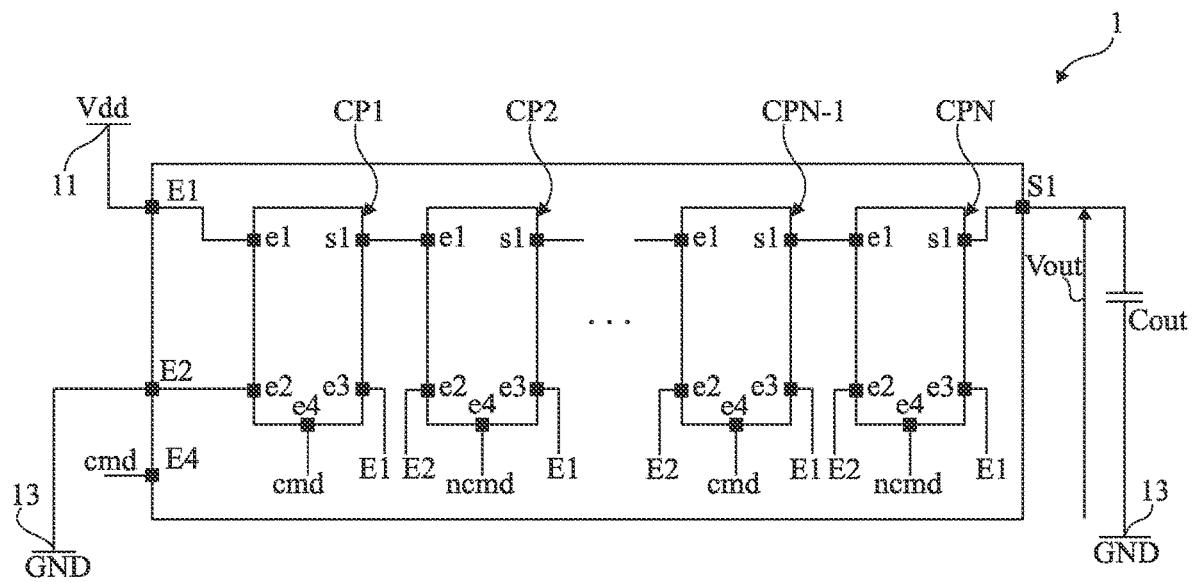
FIG. 2 shows, in the form of a circuit, another embodiment of a charge pump of the type to which the disclosed embodiments apply.

FIG. 2 shows, in the form of a circuit, another embodiment of a charge pump 1 of the type to which the disclosed embodiments apply. More specifically, the charge pump 1 of FIG. 2 is similar to the charge pump 1 of FIG. 1, with the difference that it comprises N stages CP as described in FIG. 1, the stages CP here being referenced CPi (CP1, CP2, ... , CPN−1, CPN) with i being an integer ranging from 1 to N. In this example, the stages CPi are connected in series.

More specifically, the charge pump 1 comprises a first stage CP1, the input e1 of which is connected to the input E1 of the charge pump, and a last stage CPN whose output s1 is connected to the output S1 of the charge pump 1. Each stage CPi between the first stage CP1 and the last stage CPN has its input e1 connected to the output s1 of the preceding stage, and its output s1 connected to the input e1 of the following stage. In other words, for i between 2 and N−1, a given stage CPi has its input e1 connected to the output s1 of the stage CPi−1, and its output s1 connected to the input e1 of the stage CPi+1.

Furthermore, all of the stages CPi have their inputs e3 connected to the input E1 of the charge pump 1, and their inputs e2 connected to the input E2 of the charge pump 1.

Furthermore, the stages are controlled from the signal cmd. More specifically, in this example, the stages are controlled such that two successive stages are controlled in phase opposition.

In other words, when a given stage CPi is in its first operating phase where both of its switches IT11 and IT12 are closed and both of its switches IT21 and IT22 are open, the following stage CPi+1, if there is one, and the preceding stage CPi−1, if there is one, are in their second operating phase where their two switches IT11 and IT12 are open and their two switches IT21 and IT22 are closed. Reciprocally, when a given stage CPi is in its second operating phase where both of its switches IT11 and IT12 are open and both of its switches IT21 and IT22 are closed, the following stage CPi+1, if there is one, and the preceding stage CPi−1, if there is one, are in their first operating phase where their two switches IT11 and IT12 are closed and their two switches IT21 and IT22 are open.

In this example where the stages CPi are connected in series and where the input E1 of the charge pump 1 receives the same potential Vdd as that received by the inputs e3 of the stages CPi, the output S1 of the charge pump 1 is configured to supply, in static state, a potential Vout substantially equal to N+1 times the potential Vdd.

In the example shown in FIG. 2, in order for two given successive stages CPi and CPi+1 to be controlled in phase opposition, the stage CPi receives the signal cmd and the stage CPi+1 receives a signal ncmd complementary to the signal cmd. In other words, when the signal cmd received by the input e4 of the stage Cpi is in its first binary state and the stage CPi is in its first operating phase, the signal ncmd received by the input e4 of the stage CPi+1 is in its second binary state and the stage CPi+1 is in its second operating phase. In a complementary manner, when the signal cmd received by the input e4 of the stage Cpi is in its second binary state and the stage CPi is in its second operating phase, the signal ncmd received by the input e4 of the stage CPi+1 is in its first binary state and the stage CPi+1 is in its first operating phase.

It would be desirable to be able to monitor the value of the potential Vout. Indeed, in a given electronic system, the potential Vdd generally has a constant value, this constant value being able to vary over time, in particular when the potential Vdd is supplied by a battery. Furthermore, the components configured to receive the potential Vout may require a specific value of the potential Vout to work correctly, which may be different from N+1 times the value of the potential Vdd. Furthermore, the value of the potential Vout may have to be modified, or adjusted, during the operation of an electronic system comprising the charge pump 1.

In order to check the value of the potential Vout, one may think to add a voltage regulator between the node 11 and the input E1 of the charge pump to check the value of the potential on the input E1, therefore the value of the potential Vout. For example, such a regulator would comprise a MOS transistor between the node 11 and the input E1, controlled by the output of an operational amplifier, an inverting input (−) of which would be connected to the output S1 of the charge pump 1, and a non-inverting input (+) of which would be connected to a node for applying a setpoint signal.

However, providing such a MOS transistor would cause a voltage drop between the node 11 and the input E1, which would at least be equal to the product of the minimum resistance in the on state of the transistor multiplied by the input current Iin on the terminal E1, the current Iin being equal to N+1 times the output current Iout on the terminal S1. Thus, even with a relatively low current Iout, for example in the order of around ten milliamperes, the voltage drop across the terminals of the transistor could be relatively high, for example in the order of one or several tenths of a volt. Thus, for a given value of the potential Vdd, the maximum voltage Vout that the charge pump 1 would be able to supply would be reduced relative to the case where the input E1 is directly connected to the node 11, as is shown in FIGS. 1 and 2.

Furthermore, in practice, each stage CPi has an output impedance Zout equal to the inverse of the product of the capacitance C by the switching frequency fs of the signal cmd, this signal cmd preferably being switched between its two binary states periodically. Thus, the potential Vout available on the output S1 of the charge pump 1 is not equal to N+1 times the potential Vdd, but to N+1 times the potential Vdd minus N times the product of the current Iout times the impedance Zout. Thus, by decreasing the impedance Zout, it is possible to increase the maximum value of the potential Vout that the charge pump 1 is able to deliver for a given value of the supply potential Vdd. The output impedance Zout of each stage CPi can be reduced by increasing the value of the capacitance C and/or the frequency fs of the signal cmd. However, increasing the value of the capacitance C would cause an increase in the surface occupied by the charge pump 1, which is not desirable. Thus, it is preferably to have as high a frequency fs as possible.

Reciprocally, for a given pair of values of the potentials Vdd and Vout, therefore for a given value of the output impedance Zout of the stages, increasing the frequency fs of the signal cmd makes it possible to reduce the capacitance, therefore to decrease the surface occupied by the charge pump.

The preceding applies to the charge pump 1 of FIG. 1, for which N is equal to 1. More generally, the preceding applies to any charge pump having one or several switched-capacitor charge pump stages, connected in series and/or in parallel, whether the charge pump is configured to supply a higher or lower potential Vout, in absolute value, than the supply potential that it receives, the sign of the potential Vout optionally being opposite that of the supply potential, for example in the case where the charge pump is configured to deliver a negative potential Vout from a positive supply potential.

It is proposed herein to condition the supply of a periodic control signal to the input E4 of the charge pump 1 as a function of the state of a pulse width-modulated signal based on a deviation between the value of the potential Vout and a setpoint value of the potential Vout. The frequency of the control signal supplied to the input E4 is then greater than the frequency of the pulse width-modulated signal. In this way, the frequency of the periodic signal can be chosen to be relatively high, for example greater than 10 MHz, or even 50 MHz or 100 MHz, which can for example make it possible to keep a relatively low impedance Zout. As an example, the frequency of the periodic signal is greater than at least ten times the frequency of the pulse width-modulated signal.

Furthermore, the periodic signal has a constant duty factor, for example equal to one half, and according to one embodiment, it is preferred to provide that only full periods of the periodic signal are supplied to the input E4. In this way, the frequency of the noise related to the generation of the pulse width-modulated signal, and above all the frequencies of the switching noise related to the openings and closings of the switches of the charge pump 1 in synchronization with the periodic signal, are known and can be chosen not to disrupt the operation of an electronic system comprising the charge pump 1.

Figure 3:
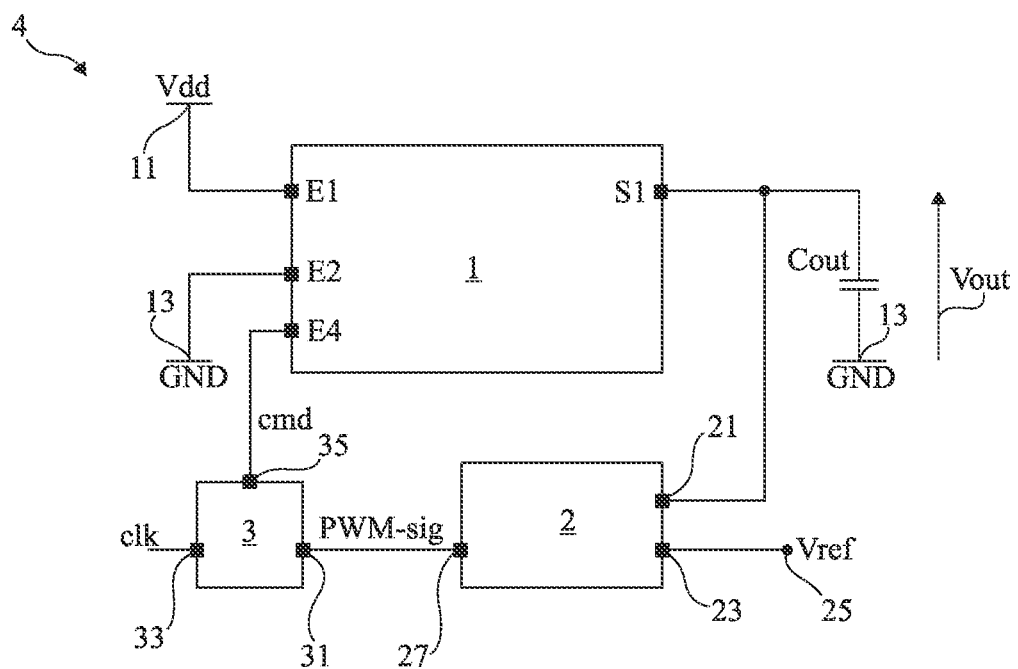
FIG. 3 shows, schematically and in block diagram form, an embodiment of a charge pump device.

FIG. 3 shows, very schematically and in block diagram form, an embodiment of a charge pump device 4 in which the supply of the periodic control signal to the charge pump is conditioned by a pulse width-modulated signal. In this example, the charge pump of the device 4 is a charge pump 1 as illustrated by FIG. 1 or FIG. 2.

The device 4 includes a circuit 2 configured to supply a pulse width-modulated signal PWM-sig, based on the deviation between the output potential Vout of the charge pump 1 and a potential Vref representative of a setpoint value of the potential Vout, the potential Vref being referenced to the ground.

More specifically, the circuit 2 comprises an input 21 configured to receive the potential Vout, the input 21 being connected to the output S1 of the charge pump 1. The circuit 2 further comprises an input 23 configured to receive the potential Vref, the input 23 being connected to a node 25 for applying the potential Vref. The circuit 2 comprises an output 27 configured to supply the binary signal PWM-sig.

The device 4 further includes a circuit 3 configured to condition, as a function of the state of the signal PWM-sig, the supply of a periodic binary signal clk with a constant duty factor, for example equal to one half, to the control input E4 of the charge pump. For example, the circuit 3 is configured so that the signal cmd received by the input E4 of the charge pump is identical to the signal clk when the signal PWM-sig is in its first binary state, for example the high state, and so that the signal cmd is kept in a given binary state, for example the low state, when the signal PWM-sig is in its second binary state, for example the low state.

More specifically, the circuit 3 comprises an input 31 coupled to the output 27 of the circuit 2 so as to receive a signal representative of the signal PWM-sig, preferably the input 31 being connected to the output 27 to receive the signal PWM-sig. The circuit 3 further comprises an input 33 configured to receive the periodic signal, or clock signal, clk. The circuit 3 comprises an output 35 connected to the input E4, configured to supply the signal cmd from signals PWM-sig and clk.

According to one embodiment, the circuit 3 is configured to supply only complete periods of the signal clk to the input E4 of the charge pump. In other words, the circuit 3 is configured so that, when the signal PWM-sig switches from its second binary state to its first binary state, the signal cmd is kept in its second binary state until the beginning of a following period of the signal clk, the signal cmd next being equal to the signal clk until the signal PWM-sig switches from its first binary state to its second binary state. Similarly, the circuit 3 is configured so that, when the signal PWM-sig switches from its first binary state to its second binary state, the signal cmd is equal to the signal clk until the end of the current period of the signal clk, the signal cmd next being kept in its second binary state until the signal PWM-sig switches from its second binary state to its first binary state.

Because the signal cmd only comprises complete periods of the signal clk, all of the frequencies of the noise related to the switching of the switches of the charge pump 1 are known. This, for example, makes it possible to select the frequency fs of the signal clk such that these frequencies of the switching noise do not disrupt other devices of an electronic system comprising the device 4.

Figure 4:
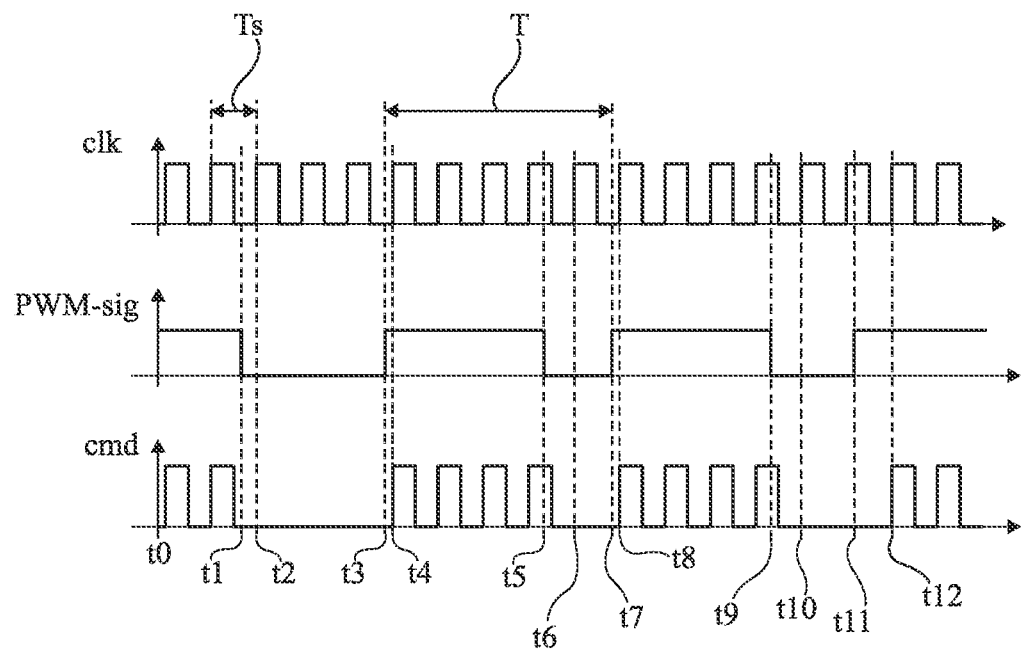
FIG. 4 shows timing diagrams illustrating the operation of the device of FIG. 3 according to one embodiment.

FIG. 4 shows timing diagrams illustrating the operation of the device 4 of FIG. 3 according to one embodiment. More specifically, FIG. 4 shows a timing diagram of the signal clk with period Ts and duty factor one half (at the top of FIG. 4), a timing diagram of the signal PWM-sig with period T (in the middle of FIG. 4) and a timing diagram of the signal cmd (at the bottom of FIG. 4). In this embodiment, the circuit 3 is configured only to transmit complete periods of the signal clk.

At a moment t0, the signal PWM-sig is in its first binary state, in this example the high state. The signal PWM-sig switches to its second binary state, in this example the low state, at a moment t1 after the moment t0, in the middle of a period Ts of the signal clk ending at a moment t2 after the moment t1.

Thus, between the moments t0 and t2, the signal cmd is identical to the signal clk.

After the moment t2, the signal cmd is kept in its second binary state, in this example the low state, at least until the following switching of the signal PWM-sig to its first binary state at a moment t3 after the moment t2. At the moment t3, the switching of the signal PWM-sig takes place in the middle of a period Ts of the signal clk. The signal cmd is then kept in its second binary state until the beginning of the following period Ts of the signal clk, at a moment t4 after the moment t3. At a moment t5 after the moment t4, the signal PWM-sig switches to its second binary state, in the middle of a period Ts of the signal clk ending at a moment t6 after the moment t5.

Thus, between the moments t4 and t6, the signal cmd is identical to the signal clk.

After the moment t6, the signal cmd is kept in its second binary state, at least until the following switching of the signal PWM-sig to its first binary state at a moment t7 after the moment t6. At the moment t7, the switching of the signal PWM-sig takes place in the middle of a period Ts of the signal clk. The signal cmd is then kept in its second state until the beginning of the following period Ts of the signal clk, at a moment t8 after the moment t7. At a moment t9 after the moment t8, the signal PWM-sig switches to its second binary state, in the middle of a period Ts of the signal clk ending at a moment t10 after the moment t9.

Thus, between the moments t8 and t10, the signal cmd is identical to the signal clk.

After the moment t10, the signal cmd is kept in its second binary state, at least until the following switching of the signal PWM-sig to its first binary state at a moment t11 after the moment t10. At the moment t11, the switching of the signal PWM-sig takes place in the middle of a period Ts of the signal clk. The signal cmd is then kept in its second state until the beginning of the following period Ts of the signal clk, at a moment t12 after the moment t11. From the moment t12, the signal cmd is identical to the signal clk.

In an embodiment variant (not illustrated) where the circuit 3 is configured to supply the signal clk to the input E4 of the charge pump 1 only when the signal PWM-sig is in its first binary state, the signal cmd is identical to the signal clk between the moments t0 and t1, between the moments t3 and t5, between the moments t7 and t9, and from the moment t11, the signal cmd further being kept in its second binary state between the moments t1 and t3, between the moments t5 and t7, and between the moments t9 and t11.

Figure 5:
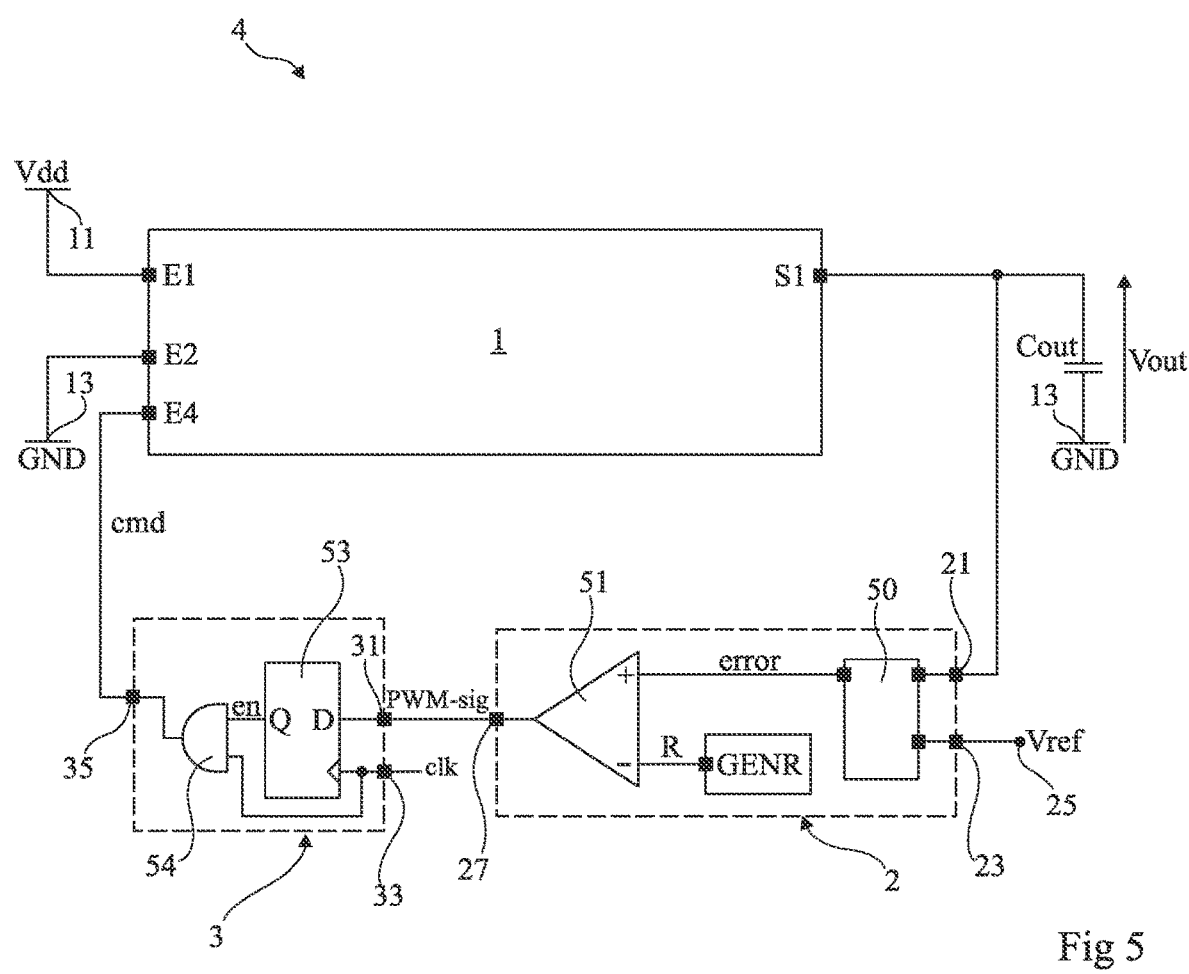
FIG. 5 shows a more detailed embodiment of the device of FIG. 3.

FIG. 5 illustrates a more detailed embodiment of the device 4 of FIG. 3, in the case where the circuit 3 is configured only to supply complete periods of the signal clk to the input E4 of the charge pump.

In the embodiment of FIG. 5, the circuit 2 comprises an error amplifier 50, a generator GENR of periodic ramps R, and a comparator 51.

The error amplifier 50 is configured to supply an error signal representative of the deviation between the potential Vout and its setpoint value. Thus, the error amplifier 50 comprises a first input coupled to the input 21 of the circuit 2, a second input connected to the input 23, and an output supplying the error signal. As an example, the value of the error signal increases when the potential Vout decreases relative to its setpoint value.

Although this is not shown in FIG. 5, a circuit configured to supply, to the first input of the amplifier 50, a potential representative of the potential Vout but the values of which are compatible with the operation of the error amplifier 50, can be provided in the circuit 2. This circuit, for example a resistive divider bridge, then couples the input 21 of the circuit 2 to the first input of the error amplifier 50. In a variant, this adaptation circuit of the level of the potential Vout can be outside the circuit 2, and then couples the output of the charge pump 1 to the input 21 of the circuit 2.

The implementation of the error amplifier 50, for example with an amplifier of the PID (proportional integral derivative) type, and, if applicable, an adaptation circuit for the level of the potential Vout, is within the capabilities of one skilled in the art.

The circuit GENR is configured to supply periodic potential ramps R, the period of the ramps R being equal to the period T of the signal PWM-sig. As an example, the ramps R are increasing potential ramps referenced relative to the ground, for example potential ramps ranging from a zero value to a value equal to Vdd.

The implementation of the ramp R generator GENR is within the capabilities of one skilled in the art.

The comparator 51 comprises an input, for example an inverting input (−), configured to receive the signal R and connected to the output of the generator GENR on which the potential ramps R are available. The comparator 51 comprises another input, for example a non-inverting input (+), configured to receive the error signal and connected to the output of the circuit 50. The signal PWM-sig is available on the output of the comparator 51 that is coupled, preferably connected, to the output 27 of the circuit 2.

Thus, as long as the signal R is less than the error signal, the signal PWM-sig is in its first binary state, in this example the high state, and once the signal R becomes greater than the error signal, the signal PWM-sig switches to its second binary state, in this example the low state. Thus, in this example, the lower the potential Vout is relative to its setpoint value, the higher the value of the error signal is, and the longer the signal PWM-sig stays in its first state for a given period of the signal PWM-sig.

Furthermore, in the embodiment of FIG. 5, the circuit 3 comprises a D flip-flop 53 and a logic gate 54.

A data input D of the flip-flop 53 is configured to receive the signal PWM-sig and is connected to the input 31 of the circuit 3. A synchronization input of the flip-flop 53 is configured to receive the signal clk and is connected to the input 33 of the circuit 3. An output Q of the flip-flop 53 supplies an activation signal en.

The logic gate 54, in this example an AND gate, is configured to copy the signal clk on its output only when the activation signal is in a first binary state, in this example the high state. More specifically, a first input of the logic gate 54 is coupled, preferably connected, to the output Q of the flip-flop 53, a second input of the gate 54 is coupled, preferably connected, to the input 33 of the circuit 3 so as to receive the signal clk, and the output of the gate 54 is coupled, preferably connected, the output 35 of the circuit 3. The signal cmd is available on the output of the gate 54.

Thus, during each rising edge of the signal clk, the binary state of the signal PWM-sig is copied on the output Q of the flip-flop 53, and is maintained until the following rising edge of the signal clk. Furthermore, as long as the signal en is in a binary state corresponding to the first binary state of the signal PWM-sig, the signal clk is transmitted on the output of the gate 54, therefore on the input E4 of the charge pump 1.

In an embodiment variant (not illustrated) where the circuit 3 is configured to supply the signal clk to the input E4 of the charge pump 1 only when the signal PWM-sig is in its first binary state, the flip-flop 53 is omitted and the inputs of the gate 54 are coupled to the respective inputs 31 and 33 of the circuit 3.

It has been observed that with a device 4 of the type described in relation with FIG. 3 or FIG. 5, the bandwidth of the loop comprising the circuits 2 and 3 is, for example, equal to one tenth of the frequency of the signal PWM-sig. For example, with a frequency of the signal clk equal to 40 MHz, and a frequency of the signal PWM-sig 40 times lower than the frequency of the signal clk, the bandwidth of the loop comprising the circuits 2 and 3 is equal to 100 kHz, and the device 4 can therefore react to a change in the value of the potential Vout or the potential Vref in several tens of microseconds, for example in less than 100 µs.

Although a charge pump 1 has been described comprising stages CPi in series, one skilled in the art is able to provide a device 4 in which the stages CPi of the charge pump 1 are associated in parallel and optionally in series. For example, the charge pump 1 can comprise several assemblies each including several stages in parallel, the assemblies being connected in series. More generally, one skilled in the art is able to provide a device 4 in which the charge pump 1 comprises one or several charge pump stages different from those disclosed in relation with FIGS. 1 and 2, these stages each comprising at least one capacitor and switches controlled from the signal cmd. If applicable, one skilled in the art will also be able to adapt how these stages are controlled from the signal cmd received by the charge pump and previously disclosed.

Various embodiments and variants have been described. Those skilled in the art will understand that certain features of these embodiments can be combined and other variants will readily occur to those skilled in the art. In particular, for each of the signals PWM-sig, clk and cmd, the high and low states indicated as an example for this signal can be inverted, one skilled in the art being able to adapt the device 4 accordingly.

Finally, the practical implementation of the embodiments and variants described herein is within the capabilities of those skilled in the art based on the functional description provided hereinabove. In particular, one skilled in the art is able to provide embodiments of the circuits 2 and 3 other than those disclosed in relation with FIG. 5.

The invention claimed is:

1. A device, comprising:
a charge pump;
a first circuit configured to supply a pulse width-modulated signal as a function of a deviation between an output voltage of the charge pump and a setpoint voltage; and
a second circuit configured to selectively pass a periodic signal having a fixed pulse width to a control input of the charge pump in response to a state of the pulse width-modulated signal such that only complete periods of the periodic signal are supplied to the control input of the charge pump.

2. The device according to claim 1, wherein the second circuit comprises a D flip-flop having a synchronization input configured to receive the periodic signal, a data input configured to receive the pulse width-modulated signal and an output configured to supply an activation signal that controls the selective passing of the periodic signal to the control input of the charge pump.

3. The device according to claim 2, wherein the second circuit further comprises a logic gate having a first input configured to receive the activation signal, a second input configured to receive the periodic signal, and an output coupled to the control input of the charge pump; wherein said logic gate is configured to selectively pass the periodic signal through to the output of the logic gate only when the activation signal is in a first state.

4. The device according to claim 3, wherein said logic gate is an AND gate.

5. The device according to claim 1, wherein the first circuit comprises:
an error amplifier configured to supply an error signal representative of the deviation between the output voltage and the setpoint voltage;
a periodic ramp generator configured to generate a periodic ramp signal; and
a comparator having a first input configured to receive the error signal, a second input configured to receive the periodic ramp signal, and an output configured to supply the pulse width-modulated signal.

6. The device according to claim 5, wherein the error amplifier is a derivative integral proportional amplifier.

7. The device according to claim 1, wherein a frequency of the pulse width-modulated signal is less than a frequency of the periodic signal.

8. The device according to claim 7, wherein the frequency of the pulse width-modulated signal is between 10 times and 50 times lower than the frequency of the periodic signal.

9. The device according to claim 1, wherein a period of the periodic signal is less than 1 μs.

10. The device according to claim 1, wherein the charge pump is configured to receive a supply potential and a reference potential, the charge pump comprising at least one charge pump circuit including:
a capacitor;
two sets of switches configured to be controlled from said periodic signal at the control input such that a first set of the two sets is controlled in phase opposition relative to a second set of the two sets;
a first input configured to receive a first potential; and
an output configured to supply a second potential substantially equal to a sum of the first potential and the supply potential.

11. The device according to claim 10, wherein said at least one charge pump circuit further includes:
a second input configured to receive the reference potential; and
a third input configured to receive the supply potential.

12. The device according to claim 11, wherein said at least one charge pump circuit includes:
a first switch of the first set coupling the first input of the charge pump circuit to a first terminal of the capacitor;
a second switch of the first set coupling the second input of the charge pump circuit to a second terminal of the capacitor;
a third switch of the second set coupling the first terminal of the capacitor to the output of the charge pump circuit; and
a fourth switch of the second set coupling the second terminal of the capacitor to the third input of the charge pump circuit.

13. The device according to claim 10, wherein the charge pump comprises a plurality of charge pump circuits connected in series, one after the other.

14. The device according to claim 13, wherein the first input of a first charge pump circuit of said plurality of charge pump circuits is configured to receive the supply potential and wherein the output of a last charge pump circuit of said plurality of charge pump circuits is configured to supply the output voltage; and wherein each charge pump circuit between the first charge pump circuit and the last charge pump circuit has its first input connected to the output of a preceding charge pump circuit and its output connected to the first input of a following charge pump circuit.

15. A device, comprising:
a charge pump;
a first circuit configured to supply a pulse width-modulated signal as a function of a deviation between an output voltage of the charge pump and a setpoint voltage; and
a second circuit configured to control supply of a periodic signal to a control input of the charge pump as a function of a state of the pulse width-modulated signal, said second circuit comprising:
a flip-flop having a synchronization input configured to receive the periodic signal, a data input configured to receive the pulse width-modulated signal and an output configured to supply an activation signal; and
a logic circuit having a first input configured to receive the activation signal, a second input configured to receive the periodic signal, and an output coupled to the control input of the charge pump.

16. The device according to claim 15, wherein said logic circuit is an AND gate.

17. The device according to claim 15, wherein the first circuit comprises:
an error amplifier configured to supply an error signal representative of the deviation between the output voltage and the setpoint voltage;
a periodic ramp generator configured to generate a periodic ramp signal; and
a comparator having a first input configured to receive the error signal, a second input configured to receive the periodic ramp signal, and an output configured to supply the pulse width-modulated signal.

18. The device according to claim 17, wherein the error amplifier is a derivative integral proportional amplifier.

19. The device according to claim 15, wherein a frequency of the pulse width-modulated signal is less than a frequency of the periodic signal.

20. The device according to claim 19, wherein the frequency of the pulse width-modulated signal is between 10 times and 50 times lower than the frequency of the periodic signal.

21. The device according to claim 15, wherein a period of the periodic signal is less than 1 µs.

22. A device, comprising:
a charge pump;
a first circuit configured to supply a first signal having a pulse width that is modulated as a function of a deviation between an output voltage of the charge pump and a setpoint voltage; and
a second circuit configured to selectively pass a second signal having a fixed pulse width as a control signal to a control input of the charge pump in response to logic states of the first signal, where:
the control signal is equal to the second signal in response to a first logic state of the first signal;
the control signal is in a not asserted logic state in response to a second logic state of the first signal;
in response to a change of the first signal from a first logic state to a second logic state, the control signal remains equal to the second signal until an end of a current period of the second signal after which it is in the not asserted logic state; and
in response to a change of the first signal from the second logic state to the first logic state, the control signal is in the not asserted logic state until an end of a current period of the second signal after which is it equal to the second signal.

23. The device according to claim 22, wherein the second circuit comprises:
a flip-flop having a synchronization input configured to receive the second signal, a data input configured to receive the first signal and an output configured to supply an activation signal; and
a logic circuit having a first input configured to receive the activation signal, a second input configured to receive the second signal, and an output coupled to the control input of the charge pump.

24. The device according to claim 23, wherein said logic circuit is an AND gate.

25. The device according to claim 22, wherein the first circuit comprises:
an error amplifier configured to supply an error signal representative of the deviation between the output voltage and the setpoint voltage;
a periodic ramp generator configured to generate a periodic ramp signal; and
a comparator having a first input configured to receive the error signal, a second input configured to receive the periodic ramp signal, and an output configured to supply the pulse width-modulated signal.

26. The device according to claim 25, wherein the error amplifier is a derivative integral proportional amplifier.

27. The device according to claim 22, wherein a frequency of the first signal is less than a frequency of the second signal.

28. The device according to claim 27, wherein the frequency of the first signal is between 10 times and 50 times lower than the frequency of the second signal.

29. The device according to claim 22, wherein a period of the second signal is less than 1 µs.

30. A device, comprising:
a charge pump;
a first circuit configured to supply a pulse width-modulated signal as a function of a deviation between an output voltage of the charge pump and a setpoint voltage; and
a second circuit configured to supply of a periodic signal to a control input of the charge pump in response to a state of the pulse width-modulated signal such that only complete periods of the periodic signal are supplied to the control input of the charge pump;
wherein a frequency of the pulse width-modulated signal is less than a frequency of the periodic signal.

31. The device according to claim 30, wherein the second circuit comprises a D flip-flop having a synchronization input configured to receive the periodic signal, a data input configured to receive the pulse width-modulated signal and an output configured to supply an activation signal that controls the supply of the periodic signal to the control input of the charge pump.

32. The device according to claim 31, wherein the second circuit further comprises a logic gate having a first input configured to receive the activation signal, a second input configured to receive the periodic signal, and an output coupled to the control input of the charge pump; wherein said logic gate is configured to copy the periodic signal on the output of the logic gate only when the activation signal is in a first state.

33. The device according to claim 32, wherein said logic gate is an AND gate.

34. The device according to claim 30, wherein the first circuit comprises:
an error amplifier configured to supply an error signal representative of the deviation between the output voltage and the setpoint voltage;
a periodic ramp generator configured to generate a periodic ramp signal; and
a comparator having a first input configured to receive the error signal, a second input configured to receive the periodic ramp signal, and an output configured to supply the pulse width-modulated signal.

35. The device according to claim 34, wherein the error amplifier is a derivative integral proportional amplifier.

36. The device according to claim 30, wherein the frequency of the pulse width-modulated signal is between 10 times and 50 times lower than the frequency of the periodic signal.

37. The device according to claim 30, wherein a period of the periodic signal is less than 1 µs.

38. The device according to claim 30, wherein the charge pump is configured to receive a supply potential and a reference potential, the charge pump comprising at least one charge pump circuit including:

a capacitor;

two sets of switches configured to be controlled from said periodic signal at the control input such that a first set of the two sets is controlled in phase opposition relative to a second set of the two sets;

a first input configured to receive a first potential; and an output configured to supply a second potential substantially equal to a sum of the first potential and the supply potential.

39. The device according to claim 38, wherein said at least one charge pump circuit further includes:

a second input configured to receive the reference potential; and a third input configured to receive the supply potential.

40. The device according to claim 39, wherein said at least one charge pump circuit includes:

a first switch of the first set coupling the first input of the charge pump circuit to a first terminal of the capacitor;

a second switch of the first set coupling the second input of the charge pump circuit to a second terminal of the capacitor;

a third switch of the second set coupling the first terminal of the capacitor to the output of the charge pump circuit; and a fourth switch of the second set coupling the second terminal of the capacitor to the third input of the charge pump circuit.

41. The device according to claim 38, wherein the charge pump comprises a plurality of charge pump circuits connected in series, one after the other.

42. The device according to claim 41, wherein the first input of a first charge pump circuit of said plurality of charge pump circuits is configured to receive the supply potential and wherein the output of a last charge pump circuit of said plurality of charge pump circuits is configured to supply the output voltage; and wherein each charge pump circuit between the first charge pump circuit and the last charge pump circuit has its first input connected to the output of a preceding charge pump circuit and its output connected to the first input of a following charge pump circuit.

\* \* \* \* \*